United States Patent [19]
Cornelius

[11] 3,817,455
[45] June 18, 1974

[54] CIRCULAR IRRIGATION SYSTEM WITH PORTABLE PIVOT POINT

[75] Inventor: Gail Cornelius, Portland, Oreg.

[73] Assignee: R. M. Wade & Co., Portland, Oreg.

[22] Filed: May 25, 1973

[21] Appl. No.: 364,084

[52] U.S. Cl.................. 239/177, 137/344, 239/212
[51] Int. Cl............................................. B05b 3/00
[58] Field of Search.................... 239/177, 212, 213; 137/344

[56] References Cited
UNITED STATES PATENTS

| | | | |
|---|---|---|---|
| 3,539,107 | 11/1970 | Mitchell | 239/177 |
| 3,583,428 | 6/1971 | Cornelius | 137/344 |
| 3,669,355 | 6/1972 | Jurgens | 239/177 |

FOREIGN PATENTS OR APPLICATIONS

| | | | |
|---|---|---|---|
| 264,790 | 5/1965 | Australia | 239/177 |

Primary Examiner—Lloyd L. King
Attorney, Agent, or Firm—Fryer, Tjensvold, Phillips & Lempio

[57] ABSTRACT

An elongated pipe including water discharging means is associated with a tower to be rotatable in a circular path thereabout. The pipe is supported by wheeled means, and the tower is also supported by wheeled means, so that the apparatus may be moved in a relatively convenient manner to any of a variety of positions on land to be irrigated.

6 Claims, 3 Drawing Figures

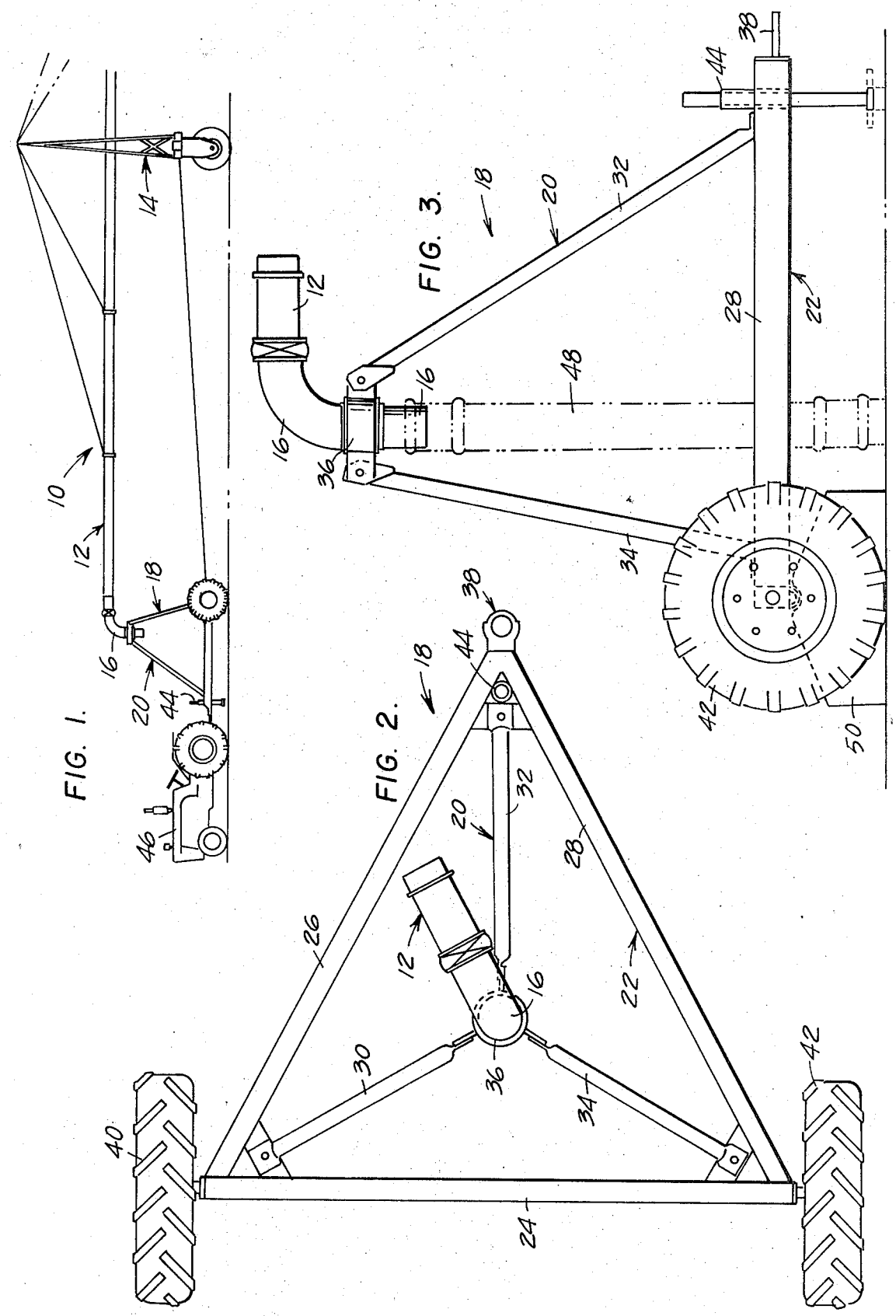

3,817,455

CIRCULAR IRRIGATION SYSTEM WITH PORTABLE PIVOT POINT

BACKGROUND OF THE INVENTION

Circular irrigating apparatuses are generally known in the industry, with one example being illustrated in U.S. Pat. No. 3,628,729 to Thomas. Such devices include an elongated boom rotatably attached at one end to a supply pipe or stand pipe oriented at the center of the area to be irrigated. The elongated pipe is supported by a plurality of wheeled supports.

In the use of a device of this type with a plurality of stand pipes fixed in different places over an area of land to be irrigated, the movement of such apparatus as described in the above mentioned patent from one such standpipe to another has been a relatively difficult and time consuming operation.

U. S. Pat. No. 3,472,456 to Strong, U.S. Pat. No. 3,140,827 to Fletcher, U.S. Pat. No. 3,409,227 to Smith, and U.S. Pat. No. 2,988,287 to Sherman each disclose a tower with which outwardly extending lines are associated, the tower being mounted on wheels so as to be relatively easily transportable. However, a study of these patents reveals that the lines thereof are not of the type which the present application is concerned with. That is, the lines disclosed in these four patents are of the type which are not supported along their lengths by support means which are in contact with the ground. Rather, the types of lines disclosed in these patents are relatively small and light, and independently supported.

Of more general interest in this area are U.S. Pat. No. 3,583,428 to Cornelius (assigned to the Assignee of this application), and U.S. Pat. No. 3,592,220 to Reinke.

SUMMARY OF THE INVENTION

It is an object of this invention to provide an irrigation system which includes an elongated pipe rotatably associated with a tower, the pipe being supported along its length by means which are in contact with the ground, the entire apparatus being relatively easily and conveniently transportable so that the pipe thereof may be connected with any of a variety of standpipes which are located on different points about the field to be irrigated.

Broadly stated, the invention is an irrigation apparatus comprising an elongated pipe having a plurality of water discharge means associated therewith, and a structure with which one end of the pipe is rotatably associated for allowing movement of the pipe relative thereto in a circular path. Wheeled means are included for supporting the pipe along its length, and wheeled means are also included for supporting the structure, so that the apparatus may be moved while being supported by the wheeled means for supporting the pipe and the wheeled means for supporting the structure.

BRIEF DESCRIPTION OF THE DRAWINGS

These and other objects of the invention will become apparent from a study of the following specification and drawings, in which:

FIG. 1 is a side elevation of the apparatus shown as it is being transported from one point to another by tractor means;

FIG. 2 is a plan view of the main portion of the apparatus, showing the pipe in pivotal association with the tower thereof; and FIG. 3 is a side elevation of the apparatus as shown in FIG. 2.

DESCRIPTION OF THE PREFERRED EMBODIMENT

Shown in FIG. 1 is a substantial portion of an irrigation apparatus 10. The portion 10 shown includes an elongated pipe 12 supported by a plurality of wheeled supports (one shown at 14) along its length. The pipe 12 may extend for a substantial distance and includes a plurality of water discharge means along its length, as is well known.

The pipe 12 is disposed in a generally horizontal position, and includes a downwardly extending end 16. The end 16 is associated with a structure 18 as shown in FIGS. 2 and 3. As shown therein, structure 18 is actually a tower 20. The tower 20 includes a base 22 made up of base members 24, 26, 28 which are fixed together in triangular form as shown. Brace members 30, 32, 34 extend upwardly and toward each other from the base 22, each brace member extending from adjacent an angle of the triangle defined by the base members 24, 26, 28. A collar 36 is fixed to the upper ends of the brace members 30, 32, 34 above the base 22, the collar 36 being supported thereby relative to the base 22.

The downwardly extending end 16 of the pipe 12 is positioned in and is rotatably disposed within the collar 36, so that movement of the pipe 12 relative to the collar 36 (and to the tower 20) is allowed in a circular path.

Hitch means are connected to the base 22 at the angle formed by base members 26, 28. Wheels 40, 42 are rotatably connected to the base 22 at the other angles of the triangle formed by the base members 24, 26, 28 shown. Jack means 44, which may be raised and lowered as is well known, are associated with base 22 adjacent the hitch means 38.

In the use of the apparatus 10, the hitch means 38 are utilized to connect the apparatus 10 to a tractor 46 (FIG. 1), and the apparatus 10 may be transported by the tractor 46, the tower 20 being supported by the wheels 40, 42 and the pipe 12 being supported along its length by wheeled supports The apparatus 10 may be moved from one standpipe fixed in the ground to another in a relatively easy and convenient manner, and upon reaching the new standpipe (as shown) for example in phantom at 48 in FIG. 3), the ends 16 on pipe 12 may be connected thereto.

Upon such positioning of tower 20, base member 24 may then be raised onto block member 50, so that the tower 20 is stably positioned and jack means 44 are extended to support the associated portion of the tower 20.

The tractor 46 may then be removed, and the pipe 12 rotated in a circular manner as is well known, the wheels of the wheeled supports 14 being positioned to so allow such circular travel. During such circular travel, water from standpipe 48 flows through pipe 12 and through water discharge means associated therewith to irrigate the land, as is also well known.

It will be seen that the apparatus 10 may be easily and conveniently transported when desired from one area to another, resulting in high economy of operation. In addition, the apparatus 10 is itself extremely simple and effective in design.

What is claimed is:

1. An irrigation apparatus comprising an elongated pipe having a plurality of water discharge means associated therewith, a structure with which one end of the pipe is rotatably associated for allowing movement of the pipe relative thereto in a circular path, wheeled means for supporting the pipe along the length thereof, and wheeled means for supporting the structure, so that the apparatus may be moved while being supported by the wheeled means for supporting the pipe and the wheeled means for supporting the structure.

2. The irrigation apparatus of claim 1 wherein the structure comprises a tower comprising a tower base, and wherein the wheeled means for supporting the structure comprise a pair of wheels rotatably connected to the base.

3. The irrigation apparatus of claim 2 wherein the tower further comprises a collar positioned above the base, and a plurality of brace members interconnecting the base and the collar for supporting the collar relative to the base, the one end of the pipe being rotatably disposed in the collar.

4. The apparatus of claim 3 wherein the base comprises first, second, and third base members fixed together in triangular form, and wherein the assembly furthr comprises hitch means connected to the base adjacent one angle of the triangle.

5. The apparatus of claim 4 wherein the pair of wheels are rotatably connected to the base adjacent the other angles of the triangle.

6. The apparatus of claim 5 wherein the plurality of brace members comprise first, second, and third brace members extending upwardly and toward each other from the base, each extending from adjacent an angle of the triangle.

* * * * *